United States Patent
Schindler et al.

(10) Patent No.: US 12,428,002 B2
(45) Date of Patent: Sep. 30, 2025

(54) METHOD FOR DETERMINING AN INTEGRITY RANGE

(71) Applicant: Robert Bosch GmbH, Stuttgart (DE)

(72) Inventors: Lena Schindler, Gerlingen (DE); Marco Limberger, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 554 days.

(21) Appl. No.: 17/414,463

(22) PCT Filed: Dec. 9, 2019

(86) PCT No.: PCT/EP2019/084171
§ 371 (c)(1),
(2) Date: Jun. 16, 2021

(87) PCT Pub. No.: WO2020/126596
PCT Pub. Date: Jun. 25, 2020

(65) Prior Publication Data
US 2022/0063642 A1   Mar. 3, 2022

(30) Foreign Application Priority Data
Dec. 18, 2018   (DE) .................... 10 2018 222 166.9

(51) Int. Cl.
*B60W 50/02* (2012.01)
*G01S 19/20* (2010.01)
*G01S 19/45* (2010.01)

(52) U.S. Cl.
CPC ......... *B60W 50/0205* (2013.01); *G01S 19/20* (2013.01); *G01S 19/45* (2013.01)

(58) Field of Classification Search
CPC ..... G01S 19/20; G01S 19/45; B60W 50/0205
See application file for complete search history.

(56) References Cited

U.S. PATENT DOCUMENTS

2004/0239560 A1   12/2004   Coatantiec et al.
2009/0140924 A1*   6/2009   Mizuochi ................ G01S 19/48
                                                       342/357.31
(Continued)

FOREIGN PATENT DOCUMENTS

CN   108508461 A   9/2018
JP   2000-292538 A   10/2000
(Continued)

OTHER PUBLICATIONS

International Search Report corresponding to PCT Application No. PCT/EP2019/084171, mailed Mar. 19, 2020 (German and English language document) (5 pages).

*Primary Examiner* — Thomas E Worden
*Assistant Examiner* — Christopher A Buksa
(74) *Attorney, Agent, or Firm* — Maginot, Moore & Beck LLP

(57) ABSTRACT

A method for determining an integrity range of a parameter estimation is disclosed. The integrity range describes the range in which an estimated parameter lies with a minimum probability. The method includes at least the following steps: a) ascertaining first integrity information on the basis of at least data from at least one first sensor or on the basis of a first method for determining the integrity information, b) ascertaining second integrity information on the basis of at least data from at least one second sensor that is different from the first sensor or on the basis of a second method that is different from the first method, for determining the integrity information, and c) determining the integrity range by merging at least the first integrity information and the second integrity information.

13 Claims, 2 Drawing Sheets

(56) References Cited

U.S. PATENT DOCUMENTS

2009/0182493 A1* 7/2009 McDonald ............. G01S 19/20
                                                    342/357.53
2011/0181465 A1   7/2011 Li et al.
2016/0084655 A1   3/2016 Roberfroid et al.

FOREIGN PATENT DOCUMENTS

WO   WO-2007062358 A2 *  5/2007  ............. G01S 19/20
WO      2009/113265 A1   9/2009

* cited by examiner

METHOD FOR DETERMINING AN INTEGRITY RANGE

This application is a 35 U.S.C. § 371 National Stage Application of PCT/EP2019/084171, filed on Dec. 9, 2019, which claims the benefit of priority to Serial No. DE 10 2018 222 166.9, filed on Dec. 18, 2018 in Germany, the disclosures of which are incorporated herein by reference in their entirety.

The disclosure relates to a method for determining an integrity range, a computer program for carrying out a corresponding method, a machine readable storage medium on which the computer program is stored and a control unit for a vehicle, wherein the control unit is set up to carry out a corresponding method. The disclosure is in particular suitable to be used in connection with autonomous driving.

BACKGROUND

One of the most important challenges for autonomous driving is the most accurate and reliable determination of the autonomous vehicle's own position. The autonomous vehicle usually has sensors such as inertial sensors, wheel sensors, environmental sensors, GNSS sensors, optical and/or acoustic sensors, which allow the vehicle to estimate its own position. In this context, it is helpful to also output information about its (expected) estimation accuracy for a determined own position. In this context, for example, the confidence of the determined own position can be represented by a so-called "protection level" (abbreviated: "PL"). The PL can describe a statistical error limit, the calculation of which is usually based on statistical considerations and, if necessary, additionally on an appropriate coordination of the estimation algorithms.

In aviation in particular, the concept of providing the protection level is widespread. However, the solutions developed in this process cannot be easily transferred to the scope of autonomous driving. In particular, for example, urban canyons and their influence on satellite signals are problems that do not occur in aviation applications. It is therefore desirable to use improved methods for calculating the most reliable level of protection, which can provide reliable results, especially in difficult environments, such as urban areas.

SUMMARY

In accordance with the disclosure, a method for determining an integrity range of a parameter estimation is proposed, wherein the integrity range describes the range in which an estimated parameter is (actually) located with a minimum probability, wherein the method includes at least the following steps:
a) determining initial integrity information based at least on data of at least a first sensor or a first method of determining integrity information,
b) determining second integrity information based at least on data of at least a second sensor which is different from the first sensor or a second method for determining integrity information which is different from the first method,
c) determining the integrity range by fusion of at least the first integrity information and the second integrity information.

Steps (a) and (b) may preferably be carried out at least partially in parallel or even simultaneously. Also preferably, the steps a) and b) are carried out at least partially before step c).

The integrity range describes the range in which an estimated parameter (value) is (actually) located with a minimum probability. The estimated parameter (value) basically describes a (single, in particular current) estimate of the parameter estimation. In other words, the integrity range describes the range in which a real or actual value of an estimated parameter lies with a minimum probability. Such an integrity range can also be called a "protection level".

The minimum probability is usually a predefined minimum probability. Preferably, the minimum probability is 90%, especially preferably 95% or even 99%.

The minimum probability with which a real or actual value of an estimated parameter actually lies in a protection level is still much higher than with "usual" integrity ranges. The minimum probability is usually over 99.99%, especially preferably over 99.999% or even over 99.9999%.—The minimum probability for the protection level can also be expressed not in percent, but in possible errors in a given time interval. For example, a protection level can be defined so that the parameter in question is outside the protection level no more than once in 10 years. For example, the protection level can be expressed either as a unitless probability or as a rate, i.e. as a probability of failure over a time interval.

Preferably, the method is used to determine an integrity range, which describes the integrity of an estimate of an own position or another driving operation parameter. This means in other words in particular that the parameter is preferably a driving operation parameter, such as an own position of a vehicle. The method can (thus) be used for example to determine an integrity range of a position estimation of a vehicle position. The integrity range can describe the area in which an estimated own position of a vehicle is (actually) located with a minimum probability. The data can be collected with sensors of the vehicle. Alternatively or cumulatively to the estimation of the vehicle's own position, the method may also be used to estimate the own speed, orientation, own movement or the like of the vehicle.

Compared to solutions in which the integrity range is always determined only depending on the main navigation solution, the solution proposed here allows the special advantage that the determination can be carried out dynamically. For example, a Kalman filter can be used as the main navigation solution. Like the position information, the integrity information obtained is also subject to a certain amount of smoothing, which is characteristic of (Kalman) filters. However, smoothing may be undesirable for integrity information, for example in an environment where integrity can change quickly, such as in urban areas where, for example, the GNSS signal can be shaded in urban canyons.

This is the first time that it has been proposed to fuse integrity information (in relation to the same estimated parameter) based on different sensors and/or different methods, in order to obtain a fused integrity range from the (various, for example smoothed and unsmoothed) integrity information that can dynamically describe the integrity of the (overall) estimation as solutions where the integrity range is always determined depending on the main navigation solution alone.

The parameter estimation can in principle include one or more methods for estimating a (the same) parameter. For example, parameter estimation can include at least two different methods, such as a first method and a method which is different from the first method for estimating the parameter. Preferably, methods for estimating the parameter are used which can also provide and/or determine integrity information about the integrity of the estimation.

In step a), initial integrity information is determined, in particular about the parameter estimation or for an estimated parameter, based on data from a first sensor and/or a first method for determining the integrity information. This means, in other words, in particular that in step a) initial integrity information is determined about an estimate result of the parameter estimation or about the integrity of the parameter estimation based on data from a first sensor and/or a first method for determining the integrity information.

The first sensor is preferably a sensor of a motor vehicle. For example, the first sensor may be a GNSS sensor, an (optical and/or acoustic) ambient sensor (such as a radar sensor, lidar sensor, ultrasonic sensor and/or camera sensor), an inertial sensor and/or a wheel sensor (such as a wheel revolution rate sensor and/or a wheel circumferential speed sensor).

The first method can in principle be the same method (type) or one of the methods (types) on which the parameter estimation is based. However, this is not mandatory. Rather, it is also conceivable that the first method is independent of the method on which the parameter estimation is based.

In step (b), a determination of second integrity information, in particular about the parameter estimation or for an (the) estimated parameter, is carried out on the basis of at least a second sensor which is different from the first sensor or a second method for determining the integrity information which is different from the first method. This means in other words, in particular that in step b) second integrity information is determined about an estimation result of the parameter estimation or about the integrity of the parameter estimation based on data from a second sensor and/or a second method for determining the integrity information.

The second sensor is preferably a sensor of a motor vehicle. For example, the second sensor may be a GNSS sensor, an (optical and/or acoustic) ambient sensor (such as a radar sensor, lidar sensor, ultrasonic sensor and/or camera sensor), an inertial sensor and/or a wheel sensor (such as a wheel revolution rate sensor and/or wheel circumferential speed sensor).

The second method can basically be the same method (type) or one of the methods (types) on which the parameter estimation is based. However, this is not mandatory. Rather, it is also conceivable that the second method is independent of the method on which the parameter estimation is based. The data used in steps (a) and (b) usually have the same time stamp or time stamps which are close together.

If the second integrity information for the estimated parameter is determined on the basis of data of at least a second sensor which is different from the first sensor, the first method and the second method for determining the integrity information can also be the same or of the same type. For example, for the determination of the first integrity information and the second integrity information, data from different sensors or sensor types (e.g. wheel revolution rate sensor and GNSS sensor) can be processed with methods of the same type, for example, each may be filtered.

In step (c), determination of the integrity range is carried out by fusion of at least the first integrity information and the second integrity information (with each other). For example, a possibly weighted overlaying can be carried out of the first integrity information with at least the second integrity information (and/or, if applicable, another integrity information (for example, a third, fourth, etc.)).

Preferably, the integrity range is a confidence interval. A confidence interval (also known as a trust range or a trust interval and an expectation range) is an interval from statistics that is intended to indicate the precision of a state estimation of a parameter (for example, an average value). The confidence interval specifies the range which includes the true state of the parameter with a certain probability (the confidence level) when a random experiment is repeated infinitely.

For example, the integrity information can be a variance and/or a residue of a particular parameter estimation. In addition, the (first and/or second) integrity information may (alternatively) also be information which is determined depending on a variance and/or a residue and/or a (different) indicator of the trustworthiness of the estimation. For example, the first integrity information can be a first confidence range, and the second integrity information can be a second confidence range.

According to an advantageous design it is suggested that the method is used for determining an integrity range of a parameter estimation of a driving operation parameter of a motor vehicle. The driving operation parameter is usually a safety-critical or safety-relevant parameter of the driving operation of a motor vehicle. Preferably, the driving operation parameter is a (safety-critical or safety-relevant) parameter of the driving operation of a motor vehicle which operates (or is operated) at least partially automatically or even autonomously.

A driving operation parameter is understood here in particular as a parameter which contributes to describing the spatial driving operation of a motor vehicle or the operation of a motor vehicle in space. In particular, the driving operation parameter contributes to describing at least in the case of an own movement and/or own position of a motor vehicle. The driving operating parameter may be, for example, an (own) position, an (own) speed, an (own) acceleration or an attitude (or orientation) of the motor vehicle. Preferably, the driving operation parameter is an own position of the motor vehicle.

According to a further advantageous embodiment it is proposed that at least the first sensor or the second sensor is arranged in or on a motor vehicle. For example, the first sensor may be a GNSS sensor that receives navigation satellite data. The second sensor may be a (further) vehicle sensor (which is not a GNSS sensor). The latter vehicle sensors may, for example, be an inertial sensor (IMUs, i.e. inertial measuring units), a wheel revolution rate sensor, a steering angle sensor, a speed sensor and/or an accelerometer. Furthermore, the first sensor or the second sensor may also be an optical sensor, such as a (stereo) camera sensor, a radar sensor or a lidar sensor, or an acoustic sensor, such as an ultrasonic sensor.

According to a further advantageous design, it is proposed that a first integrity range be determined as the first integrity information. In this context, in step a) a determination of a first integrity range for an estimated parameter can be performed based on at least a first sensor or a first method for determining the integrity range. Preferably, a first protection level is determined as the first integrity information.

According to a further advantageous design, it is proposed that a second integrity range is determined as the second integrity information. In this context, in step b) a determination of a second integrity range for the estimated parameter can be performed based at least on data of at least a second sensor which is different from the first sensor or a method which is different from the first method for determining the integrity range. Preferably, a second protection level is determined as the second integrity information. In addition, a further protection level (third protection level, fourth protection level, etc.) can also be determined as further (third, fourth, etc.) integrity information.

A protection level usually describes the (spatial, especially two-dimensional or three-dimensional) range in which an estimated parameter (value) (actually) lies with a minimum probability. The estimated parameter (value) in principle describes a (single, in particular current) #estimation result of the parameter estimation. In other words, the protection level describes the range in which a real or actual value of an estimated parameter lies with a minimum probability.

In other words, a protection level specifically describes a confidence interval or a (spatial) confidence range in which the true value of an estimated parameter lies with a minimum probability. The estimated value of the parameter is usually in the middle or the center of the confidence interval or confidence range.

In this context, it is further preferred that an overall integrity range is determined as the integrity range, which is determined by fusion of at least the first integrity range and the second integrity range. In particular, an overall protection level is determined as the integrity range, which is determined by fusion of at least the first protection level and the second protection level. Although no first or second protection levels may have been determined before, it is preferable that the integrity range is a protection level, or that it is issued as a protection level.

In addition, in step c) a (cross) plausibility check of the first protection level with the second protection level and/or vice versa can be carried out. Furthermore, a (cross) plausibility check of the first protection level and/or the second protection level can be carried out with another (third) protection level and/or vice versa.

The methods for determining the integrity information may be in particular two or more of the following methods: the method of least squares, in particular the "sequential least-squares", filter methods, in particular those that can be realized with a Kalman filter, such as "Extended Kalman Filter", "Unscented Kalman Filter", and/or particle filter, hatch filter. In addition, in principle state-descriptive functions are conceivable.

For example, the method of least squares can be used as the first method for determining the integrity information. The method of least squares can be used particularly advantageously to perform a comparatively dynamic determination (especially compared to a Kalman filter), in particular (exclusively) on the basis of GNSS data or navigation satellite data.

The method of least squares (abbreviated: LS; obsolete: least sum of squared deviations method) is a standard mathematical method for adjustment calculations. As a rule, a curve is searched for a data point cloud that is as close as possible to the data points.

For example, a Kalman filter can be used as a second method for determining integrity information. The determination by means of a Kalman filter can be used particularly advantageously to perform a comparatively reliable determination (especially in comparison to the method of least squares).

Kalman filtering techniques are often used to estimate target parameters such as position, velocity, attitude, and/or time (PVAT) in localization sensors which process the input measurements in real time. Measurements in automotive applications could include observation of GNSS (global navigation satellite systems), IMU (inertial measurement unit), wheel revolution rate sensors and/or steering angle sensors. Optical sensors such as radar, lidar or cameras could also be part of the localization system. As a rule, the Kalman filter is set up to perform a sensor data fusion of navigation satellite data (GNSS data) and data of at least one other vehicle sensor, such as inertial data. The criteria for using Kalman filtering are manifold. Among other things, the data history can be taken into account when adjusting PVAT updates to improve the stability of the solution in a beneficial way.

For example, if the method of least squares is used as the first method, and a Kalman filter provides the second method, it is particularly preferred that the fusion occurs in such a way that the gradients or rapid changes of the method of least squares are added to the (background) solution of the Kalman filter.

According to a further advantageous embodiment it is proposed that in step c) a weighting of the first integrity information and the second integrity information is carried out. This allows the special advantage that the fusion can be improved depending on the situation.

Preferably, the weighting can be carried out depending on an accuracy requirement on the estimation. For example, a higher positional accuracy may be required during a parking maneuver than a driving maneuver on the highway. In addition, the accuracy requirement can also increase with the driving speed of the vehicle.

Alternatively or cumulatively, the weighting can be carried out depending on the environment in which the sensors and/or the vehicle are currently located. For example, the weight associated with integrity information which is significantly or even exclusively based on navigation satellite data (GNSS data) can be increased if the sensors are or the vehicle is on a highway or a secondary road or have or has a clear view to navigation satellites.

On the other hand, the weights associated with integrity information which are at least partly based on vehicle sensors (which are not GNSS sensors) could be increased if the sensors are or the vehicle is located in a city, especially in an urban canyon. This can help, for example, to take into account the reduced reception of satellite signals in urban canyons and/or in tunnels.

In addition, it could also be provided that only certain integrity information may be considered at times. For example, only integrity information which is at least partly based on vehicle sensor data (which is not GNSS data) could be taken into account at times. This can be carried out, for example, for the length of time during which no or only limited satellite reception is possible.

Alternatively or cumulatively, only integrity information which is at least partly based on satellite data or GNSS data can be taken into account at times. This can be carried out, for example, for the length of time when other vehicle sensors are disturbed or defective.

In other words, this means in particular that (at times) either the first or the second (or, if applicable, the other) integrity information can be output as a (current) integrity range. This is especially carried out depending on the availability of the corresponding sensor information.

The weighting can be carried out, for example, in such a way that a compromise is realized between the reliability of reliably detecting an estimation error and the reaction time for detecting the estimation error. Depending on the environment in which the vehicle is moving, for example, the more dynamic first integrity information or the smoothed second integrity information can be given more confidence, for example by adjusting corresponding weights.

Preferably, the weighting is (also) carried out depending on the properties of the methods used to determine the integrity information. For example, the weight associated with a more dynamic method can be increased if the integrity range is to be determined more dynamically. In particular, the weighting in this context is carried out depending on the dynamic properties and/or the filter properties of the methods used.

According to a further advantageous embodiment it is proposed that third integrity information for the estimated parameter is determined at least on the basis of data of at least a third sensor or a third method for determining the integrity information and wherein the third integrity information is also taken into account in the fusion in step c).

According to a further aspect a computer program is also proposed for carrying out a method presented here. In other words, this applies in particular to a computer program (product) comprising commands that cause it to perform a method described here when the program is executed by a computer.

According to another aspect, a machine-readable storage medium is also proposed, on which the computer program presented here is stored. Routinely, the machine-readable storage medium is a computer-readable data carrier.

According to a further aspect a control unit for a motor vehicle is also proposed, wherein the control unit is set up to carry out a method presented here. The control unit is preferably a device (or a computer) for self-localization.

In addition, a motor vehicle can also be specified, which has a control unit presented here. The motor vehicle is preferably an automated and/or autonomously operating vehicle, in particular an autonomous automobile.

The details, features and advantageous embodiments discussed in connection with the method may also occur accordingly with the computer program presented here, the storage medium, the control unit and/or the vehicle and vice versa. In that regard, reference is made in full to the comments made there on the further characterization of the features.

BRIEF DESCRIPTION OF THE DRAWINGS

The solution presented here, and its technical environment are explained in more detail here on the basis of the figures. It should be noted that the disclosure should not be limited by the embodiments shown. In particular, unless explicitly stated otherwise, it is also possible to extract partial aspects of the facts explained in the figures and to combine them with other components and/or findings from other figures and/or the present description. In the figures.

DETAILED DESCRIPTION

Figure 1:
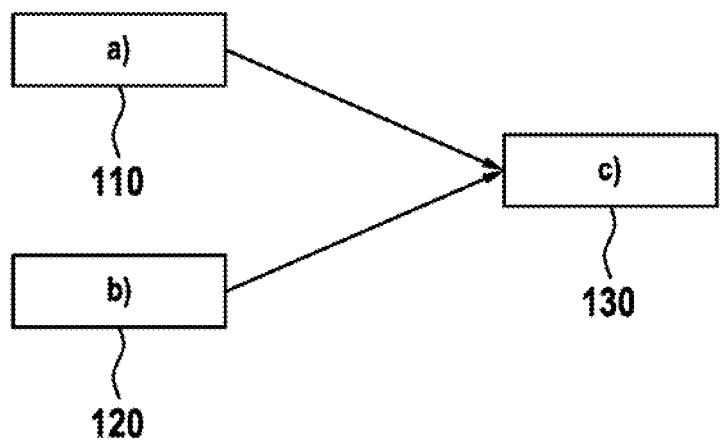
FIG. 1: shows schematically an exemplary procedure of a method proposed here.

FIG. 1 shows schematically an exemplary procedure of a method proposed here. The method is used to determine an integrity range 1 of a parameter estimation, wherein the integrity range describes the range in which an estimated parameter is located with a minimum probability. The order of the steps a), b) and c) of the method shown with blocks 110, 120 and 130 usually occurs during a regular operating procedure. In particular, steps a) and b) can be carried out at least partially in parallel or even simultaneously.

In block 110, determination of first integrity information 5 is carried out on the basis at least of data 2 of at least a first sensor 13 or a first method 4 for determining the integrity information. In block 120, determination of second integrity information 7 is carried out on the basis at least of data 3 of at least a second sensor 14 which is different from the first sensor or a second method 6 which is different from the first method 4 for determining the integrity information. In block 130, the integrity range 1 is determined by fusion of at least the first integrity information 5 and the second integrity information 7.

Figure 2:
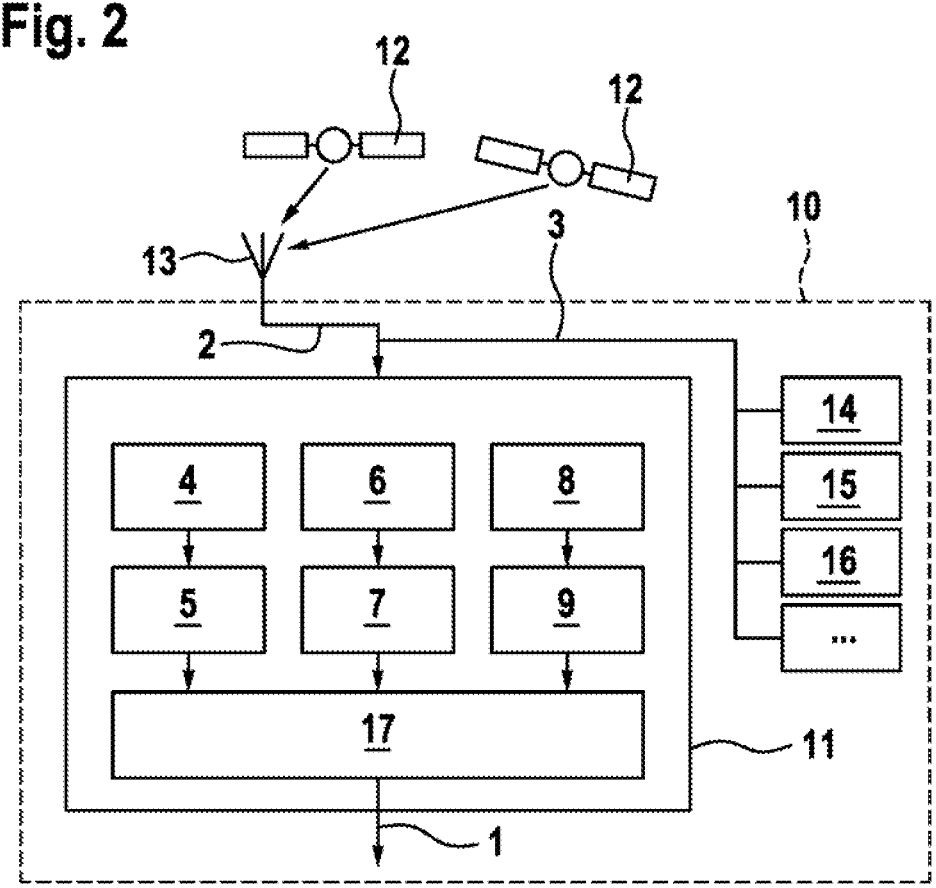
FIG. 2: shows schematically a vehicle with an exemplary embodiment of a control unit proposed here.

FIG. 2 shows schematically a motor vehicle 10 with an exemplary embodiment of a control unit 11 proposed here. The control unit 11 is set up to carry out a method proposed here. The control unit 11 is used here by way of example to determine a current own position of the motor vehicle 10.

The control unit 11 can receive data 2, 3 which allow an inference to be made regarding the own position of the vehicle 10. For example, GNSS data 2 from navigation satellites 12 can be received via an antenna 13 of the vehicle 10. GNSS stands for Global Navigation Satellite System. The GNSS data 2 include, for example, signals that allow an inference to be made regarding the position of the respective satellite 12 and the signal duration of which can be evaluated in order to determine the own position of the vehicle 10 by means of triangulation. In addition, in-vehicle data 3 can be received from sensors of the vehicle, such as an inertial sensor 14 (IMU), a speed sensor 15 and a steering angle sensor 16.

In the control unit 11 the respective own position of the vehicle 10 is estimated on the basis of these data 2, 3 with two methods 4, 6 running in parallel here by way of example and respective integrity information 5, 7 is determined for the estimated own position. In other words, this means that the methods 4, 6 are in particular methods for estimating the own position of the motor vehicle 10 and for determining the integrity information 5, 7 for the estimated own position. Thus, the own position represents an example of the estimated parameter here.

The method of least squares is used as the first method 4. For example, the method of least squares is used to estimate the (current) own position of the vehicle 10 based on (only) the captured GNSS data 2 and to provide initial integrity information 5 about the integrity of the own position estimated in this way. The method of least squares, which usually only takes into account one type of data, here for example GNSS data 2, and regularly works without taking into account a processing history and/or data history, usually reacts very dynamically to measurement value changes. However, a disadvantage of this method can be seen in reduced accuracy (compared to the Kalman filter).

An initial estimation result usually includes the (estimated) own position of the vehicle 10, determined by the method of least squares. The first integrity information 5 usually includes (estimated) integrity information determined by the method of least squares. For example, the first integrity information 5 can be a deviation from the actual own position that can be expected when applying the method of least squares. This can include a variance and/or a residue, for example. Alternatively or cumulatively, the first integrity information 5 can already include a first protection level.

The second estimation is carried out here by means of a Kalman filter. The second method 5 is accordingly based on a (sensor) fusion of GNSS data 2 with in-vehicle data and usually also takes into account the processing history and/or data history. The information from the Kalman filter, which usually includes the second estimation result of the own position and the second integrity information 7 about the integrity of the second estimation result, will be rather smooth or smoothed and can be interpreted as a model-driven low-pass filter of the input measurements.

In this case, the second estimation result usually comprises the (estimated) own position of the vehicle 10 determined by means of the Kalman filter and as the second integrity information 7 an (estimated) integrity information determined by the Kalman filter about the integrity of the (estimated) own position of the vehicle 10 determined by means of the Kalman filter. For example, the second integrity information 7 may be a deviation from the actual own position that is expected when the Kalman filter is applied. This can include, for example, a variance and/or a residue. Alternatively or cumulatively, the second integrity information 7 can also already include a second protection level.

The integrity range 1 is determined here by fusion of at least the first integrity information 5 and the second integrity information 7 or as a result of fusion 17 of the first integrity information 5 and the second integrity information 7. A weighting of the first integrity information 5 and the second integrity information 7 can also be carried out.

For example, the fusion can be carried out in such a way that the gradients or rapid changes of the method of least squares, which here represents the first method 4 and has a low accuracy (compared to the second method 6), are added to the precise and smoothed background solution of the Kalman filter, which provides the second method 6 here. This is illustrated graphically and by way of example in FIG. 3.

The weighting can be carried out, for example, in such a way that a compromise is realized between the reliability of reliably detecting an estimation error and the reaction time for detecting the estimation error. Depending on the environment in which the motor vehicle is moving 10, for example, the more dynamic first integrity information 5 or the smoothed second integrity information 7 can be given more confidence, for example by adjusting corresponding weights.

For example, also to maintain the accuracy of the second integrity information 7, which is based on the fused Kalman filter solution, the first integrity information 5, which is based on the method of least squares, can be balanced by a so-called "hatch" filter, which is applied to the difference between the two solutions.

The (current) integrity range 1 output as a result of the fusion 17 can thus advantageously unite or combine the dynamics of the method of least squares and the reliability of the Kalman filter. For example, this integrity range 1 can be a (total) protection level of the (currently) determined own position of the vehicle.

FIG. 2 also illustrates by way of example that at least third integrity information 9 for the estimated parameter can be determined based on at least data 3 of at least a third sensor 15 or a third method 8 for determining the integrity information and that the further integrity information 9 can be taken into account in the fusion in step d).

Figure 3:
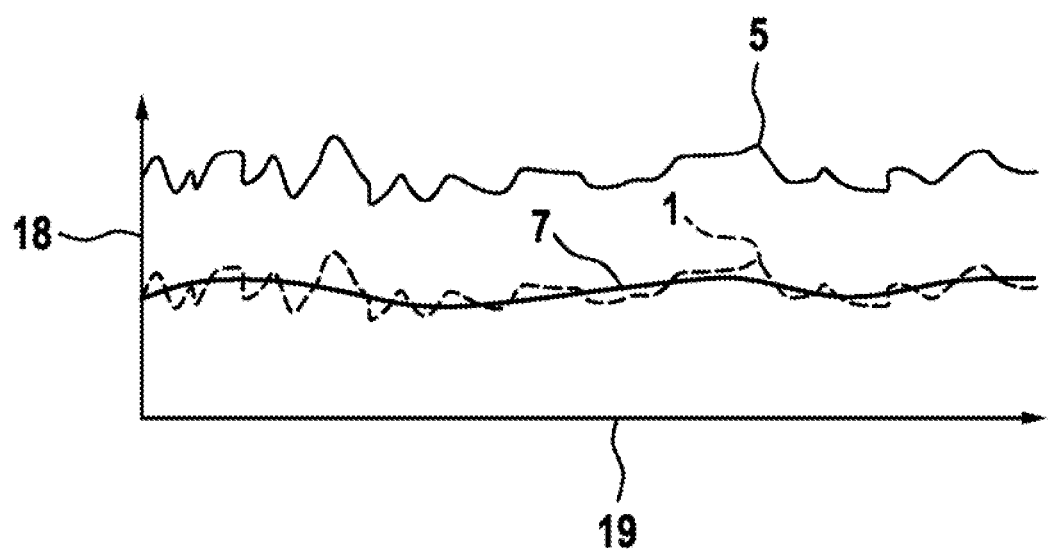
FIG. 3: shows schematically exemplary time profiles of deviation information.

FIG. 3 shows schematic exemplary time profiles of deviation information 18. According to illustration of FIG. 3, the deviation information 18 is plotted against the time 19.

The upper profile with a solid line shows the time profile of the first integrity information 5. This is determined here by way of example on the basis of the method of least squares. The first integrity information describes here, for example, the deviation from the actual position of the vehicle to be expected when applying (only) the method of least squares.

The lower profile with a solid line shows the time profile of the second integrity information 7. This is determined here by way of example on the basis of a Kalman filter solution or is output by a Kalman filter. The second integrity information 7 describes here, for example, the deviation from the actual position of the vehicle to be expected when (only) the Kalman filter is applied.

The dashed line profile illustrates, for example, the profile of the integrity range 1 determined as a result of the fusion 17. This combines the dynamic properties of the first integrity information 5 with the reliability of the second integrity information 7.

The invention claimed is:

1. A method for determining a fused integrity range of a parameter estimation, wherein the fused integrity range describes a range in which an estimated parameter is located with a minimum probability, the method comprising:
    receiving with a control unit first data from a first sensor;
    determining, with the control unit, first integrity information based on the first data from the first sensor using a least squares method;
    receiving with the control unit second data from a second sensor;
    determining, with the control unit, second integrity information based on the second data from the second sensor which is different from the first sensor using a Kalman filter;
    determining, with the control unit, the fused integrity range by fusion of at least the first integrity information and the second integrity information, wherein the fused integrity range is not larger than at least one of the first integrity information and the second integrity information at any given time; and
    using the determined position estimation and the determined fused integrity range to operate a motor vehicle with the control unit.

2. The method as claimed in claim 1, wherein the method is used for determining a fused integrity range of a parameter estimation of a driving operating parameter of a motor vehicle.

3. The method as claimed in claim 1, wherein at least one of the first data and the second data is obtained from a sensor arranged in or on a motor vehicle.

4. The method as claimed in claim 1, wherein the first integrity information is a first sensor integrity range.

5. The method as claimed in claim 4, where the second integrity information is a second sensor integrity range.

6. The method as claimed in claim 1, wherein determining the fused integrity range includes carrying out a weighting of the first integrity information and the second integrity information.

7. The method as claimed in claim 1, wherein:
    third integrity information for the estimated parameter is determined based at least on data of at least a third sensor or a third method for determining the third integrity information, and
    the third integrity information is also taken into account in the fusion in determining the fused integrity range.

8. A non-transitory machine-readable storage medium containing a computer program including program instructions which, when executed by the control unit carry out the method as claimed in claim 1.

9. The method of claim 1, wherein:
    the first data comprises first GNSS data; and
    the second data comprises in-vehicle data.

10. The method of claim 9, wherein the second data further comprises second GNSS data.

11. The method of claim 1, wherein:
the first sensor is a first type of sensor;
the second sensor is a second type of sensor; and
the first type of sensor is different from the second type of sensor.

12. A method of automatically operating a motor vehicle, comprising:
 determining a position estimation of the motor vehicle;
 determining a fused integrity range of the position estimation, by
  receiving, with a control unit of the motor vehicle, first data from a first sensor,
  determining, with the control unit, first integrity information based on the first data from the first sensor using a least squares method,
  receiving, with the control unit, second data from a second sensor,
  determining, with the control unit, second integrity information based on the second data from the second sensor which is different from the first sensor using a Kalman filter, and
  determining, with the control unit, the fused integrity range by fusion of at least the first integrity information and the second integrity information; and
 using the determined position estimation and the determined fused integrity range to operate the motor vehicle with the control unit, wherein the fused integrity range is not larger than at least one of the first integrity information and the second integrity information at any given time.

13. The method of claim 12, wherein the determining the position estimation of the motor vehicle comprises:
 determining the position estimation of the motor vehicle using the second data.

* * * * *